April 4, 1961     H. C. MICHAEL     2,978,272
TREAD REDUCTION WHEEL
Filed Sept. 30, 1959

HARRY C. MICHAEL
Inventor

United States Patent Office 2,978,272
Patented Apr. 4, 1961

2,978,272
TREAD REDUCTION WHEEL

Harry C. Michael, 520 W. 5th St., Sioux City, Iowa

Filed Sept. 30, 1959, Ser. No. 843,594

1 Claim. (Cl. 295—8.5)

This invention relates to a means for mounting tread reduction wheels on a heavy-duty truck to enable the truck to ride upon railway tracks.

This invention is to reduce the road tread of a heavy-duty truck preferably an 18,000-pound axle with a wheel flange measuring 12 inches straight across with a 10-stud bolt 1 inch thick set in a circular space 1 7/10 inches apart on wheel hub flange. This invention is to reduce the road tread from 71 inches up to a 71 3/4 inches road tread to 55 1/2 inches to be used on railroad tracks that are standardized at 56 inches between rails so as to run these heavy-duty trucks or busses on railroad tracks which is the intention of this invention.

Figure 2:
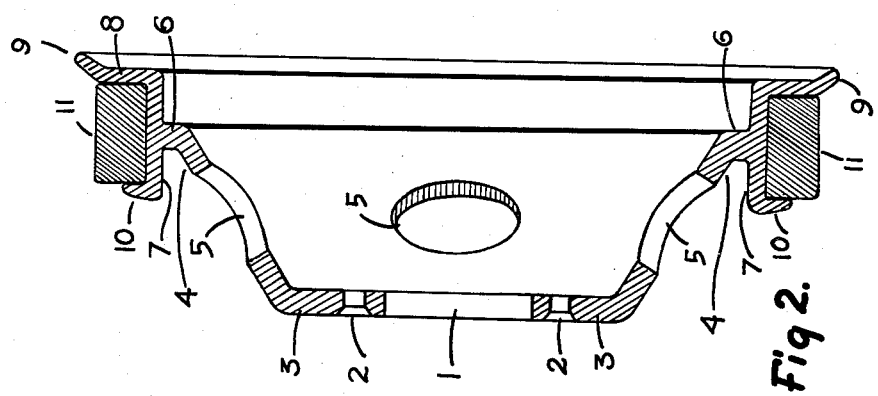
Figure 2 shows a cross-sectional view of the wheel of Figure 1.
Figure 1:
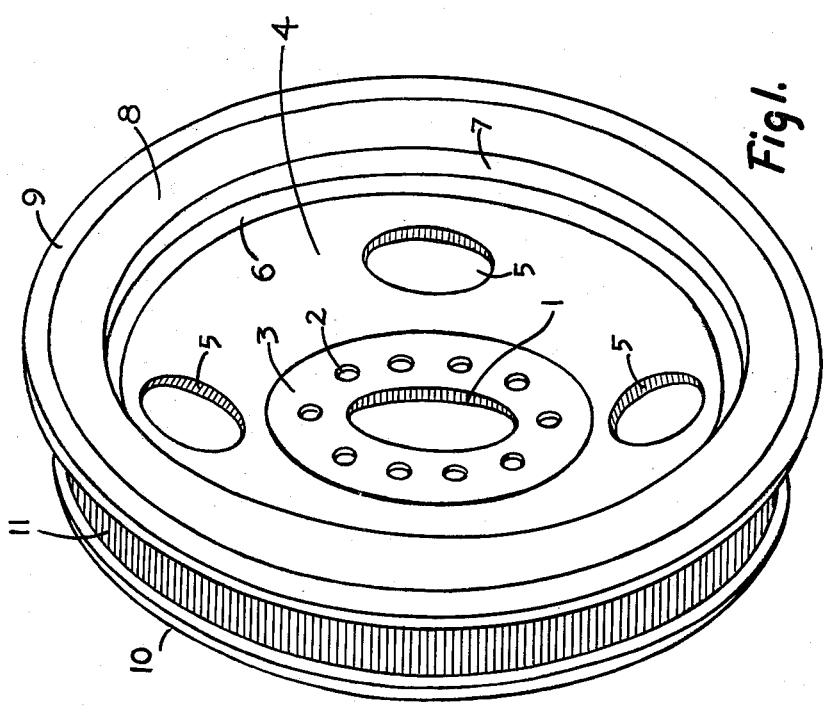
Fig. 1 shows a perspective view of the tread reduction wheel.

Referring now to Figs. 1 and 2 in detail, the wheel is provided with an axle hub receiving aperture 1 and bolt holes 2 in the mounting flange 3 to receive stud bolts to secure the wheel to a vehicle axle. The tread reduction flange 4 and rim 7 cooperate to reduce the road tread. Flange 4 is provided with holes 5 for circulation of air around the brake drum. The wheel also has a radial wheel flange 6 which joins rim 7 to flange 4. Tire 11 is mounted on the rim 7. The rim is provided with a tire protection flange 8 which has a 45 degree angled rail guard flange 9 and a tire protection flange 10.

I claim:

A rail wheel constructed for mounting on a heavy-duty truck axle comprising a cast wheel having a mounting flange integral therewith, said mounting flange having therein an axle hub receiving aperture and stud bolt receiving apertures for securing said mounting flange to said axle, said mounting flange being laterally offset from and integrally connected to a radial wheel flange by a radially and axially extending flange, said radial wheel flange having a rim integrally attached thereto which has a rubber tire mounted thereon, and is provided with tire protection flanges integral therewith, one of which has an angled rail guard flange.

References Cited in the file of this patent
UNITED STATES PATENTS

| | | |
|---|---|---|
| 2,010,617 | Willeme | Aug. 6, 1935 |
| 2,120,098 | Hug | June 7, 1938 |